United States Patent [19]
Maeda et al.

[11] Patent Number: 5,893,032
[45] Date of Patent: Apr. 6, 1999

[54] MOBILE COMMUNICATION SUBSCRIBER APPARATUS AND METHOD FOR SETTING A FUNCTION OF ANSWERING MACHINE

[75] Inventors: Satoru Maeda; Masaru Nonogaki, both of Kanagawa, Japan

[73] Assignee: Sony Corporation, Tokyo, Japan

[21] Appl. No.: 795,560

[22] Filed: Feb. 6, 1997

[30] Foreign Application Priority Data

Feb. 19, 1996 [JP] Japan ................................. 8-030392

[51] Int. Cl.⁶ .............................. H04Q 7/30; H04Q 7/32
[52] U.S. Cl. ...................... 455/412; 455/421; 455/432; 379/67.1; 379/88.22; 379/88.15
[58] Field of Search ..................................... 455/412, 453, 455/435, 524, 432, 553, 552, 436, 417, 502, 421; 379/67, 88, 89, 67.1, 88.22, 88.23, 88.24, 88.15

[56] References Cited

U.S. PATENT DOCUMENTS 5,317,624   6/1991   Obana et al. ............................ 379/61

*Primary Examiner*—Dwayne D. Bost
*Assistant Examiner*—Linwood C. Scott, Jr.
*Attorney, Agent, or Firm*—Jay H. Maioli

[57] ABSTRACT

A mobile communication subscriber apparatus such as a portable phone allows its user to make prompt contact with someone who places a call to a specific phone served as a local base station to the subscriber apparatus. The mobile communication subscriber apparatus is arranged to register its position to a base station when it is used at an external mode. This subscriber apparatus provides a mechanism for transmitting a control signal for indicating change of the settings of an answering function of the local base station.

25 Claims, 7 Drawing Sheets

BIT COMPOSITION OF CONTROL SLOT IN PHS

BIT COMPOSITION OF CONTROL SLOT IN CT-2

MOBILE COMMUNICATION SUBSCRIBER APPARATUS AND METHOD FOR SETTING A FUNCTION OF ANSWERING MACHINE

BACKGROUND OF THE INVENTION

1. Field of the Invention

The present invention relates to a mobile communication subscriber apparatus such as a portable phone which has a function of position registration to a base station, and more particularly to a method for setting a function of an answering machine for use with such a mobile communication subscriber apparatus.

2. Description of the Related Art

A mobile communication subscriber apparatus is a portable terminal device for information communication. Examples of such apparatus include a portable phone such as digital cordless phone and cellular phone or a small-sized portable personal computer (PDA: Personal Digital Assistants). The portable phone contains a digital cordless phone and a cellular phone. The small-sized portable personal computer contains a personal handyphone system (PHS) used in Japan and a CT-2 used in Europe.

Of such mobile communication subscriber apparatuses, some apparatuses may share an external mode and an internal mode and utilize either one properly. Herein, the external mode indicates a mode at which information is communicated through a base station that is a terminal for sending and receiving information is installed for public use. This mode is normally used outdoors when the mobile communication subscriber apparatus is operated independently. When the mobile communication subscriber apparatus is used at the external mode, normally, it is necessary to do a registration, in advance of a position of the apparatus itself to the base station. In general, this registration is called position registration.

On the other hand, the internal mode indicates a mode at which information is communicated through a specific phone installed at home. This mode is normally used when the mobile communication subscriber apparatus is served as a local subscriber to the local base station of the specific phone installed at home or the like.

Additionally, with the internal mode, normally, a phone number of the phone acting as a local base station (called a station phone number) is different from a phone number set to the mobile communication subscriber apparatus served at the external mode (called a subscriber phone number).

Hence, when the mobile communication subscriber apparatus is used at the external mode, someone who does not know the subscriber phone number cannot make contact with a user of the mobile communication station apparatus if he or she knows the subscriber phone number. That is, since the station phone number is different from the subscriber phone number, the user of the subscriber apparatus cannot often receive a contact from another if he or she carries the subscriber apparatus.

Further, if the phone machine acting as a local base station provides an answering function of recording a message from another person, that is, of automatically responding to a received signal, the user of the subscriber apparatus may receive a contact from another person as a recorded message. However, this kind of answering function has a shortcoming in that a message from another person is allowed to move to the user of the subscriber apparatus until he or she reproduces the message recorded in the local base station.

Moreover, if the phone machine acting as a local base station provides the answering function, a message indicating a subscriber phone number be contained in the message of the local base station and may automatically answer a received signal from another person. However, if the local base station is set to have the answering function, the mobile communication subscriber apparatus is not always usable. Hence, if the message indicating the subscriber phone number is contained in the message of the local base station automatically answers any received signal, this message may be improper if the subscriber apparatus is not in use.

SUMMARY OF THE INVENTION

In consideration of the foregoing shortcomings, the present invention is proposed. It is therefore an object of the present invention to allow a user of a mobile communication subscriber apparatus to make prompt contact with another person who places a call to a specific phone acting as a local base station to the mobile communication subscriber apparatus.

According to the present invention, when the operating state of the mobile communication subscriber apparatus is changed such as when the position of the mobile communication subscriber apparatus is registered to the base station or the position registration are released, the settings of the answering function of the local base station are automatically changed thereby eliminating the need for the user's manual change of the settings of the mobile communication subscriber apparatus.

More specifically, when the operating state of the mobile communication subscriber apparatus is changed, by changing the automatic answering message of the local base station, it is possible to correlate the automatic answering message of the local base station with to the operating state of the mobile communication subscriber apparatus. That is, for example, when the mobile communication subscriber apparatus is usable at the external mode, the automatic answering message is set to indicate the phone number of the subscriber apparatus. By this message, it is possible to give the phone number of the subscriber apparatus that may be used at the external mode to someone who places a call to the local base station.

Further, when the mobile communication subscriber apparatus is usable at the external mode, if a message is recorded in the local base station, by transferring the message to the mobile communication subscriber apparatus, it is possible for the user of the subscriber apparatus to promptly receive the message left in the local base station.

According to the present invention, since the settings of the answering function are automatically changed as mentioned above, it is possible to avoid the erroneous operation resulting from the erroneous change of the settings of the answering function. This makes it possible to positively change the settings of the answering function of the local base station for a short time. The present invention, therefore, greatly reduces the user burden regarding the change of the settings of the answering function of the local base station.

PREFERRED EMBODIMENT OF THE PRESENT INVENTION

Hereafter, the description will be oriented to the embodiments of the present invention with reference to the drawings. The present invention is not limited to the following embodiments and is subject to any variation and modification without departing from the spirit of the invention.

According to an embodiment of the present invention, as a mobile communication subscriber apparatus to which the present invention is applied, a digital cordless phone is taken as an example, the digital cordless phone is operated both at the external mode and the internal mode, that is at the external mode where the position registration is performed against the base station and at the internal mode where the subscriber apparatus has a local base station of a specific phone having an answering function. In the following description, at the internal mode, the specific phone machine acting as a local base station is simply called a local base station.

Herein, the local base station may provide a remote control function of setting answering functions from an outdoor phone with a DTMF (Dual Tone Multi-frequency) that is used for a touch-tone phone. That is, this local base station has a remote-control function of changing an automatic answering message into a message indicating a subscriber phone number that is set to the digital cordless phone or changing another automatic answering message to a message not indicating the subscriber phone number through the use of DTMF signals.

Conventionally, however, the remote control operation with the DTMF signals is performed by a manual operation, so that this operation requires the user to do troublesome operations. Hence, the operation of changing the settings of the answering phone machine through the use of DTMS signals is quite intricate and burdensome to the user. Further, conventionally, the change of the settings of the answering machine requires the user to manually do so. Hence, if the user fails in changing the settings, the automatic answering message may be incorrect. Under this condition, the digital cordless phone according to an embodiment of the present invention which will follow is arranged to overcome this shortcoming.

Figure 1:
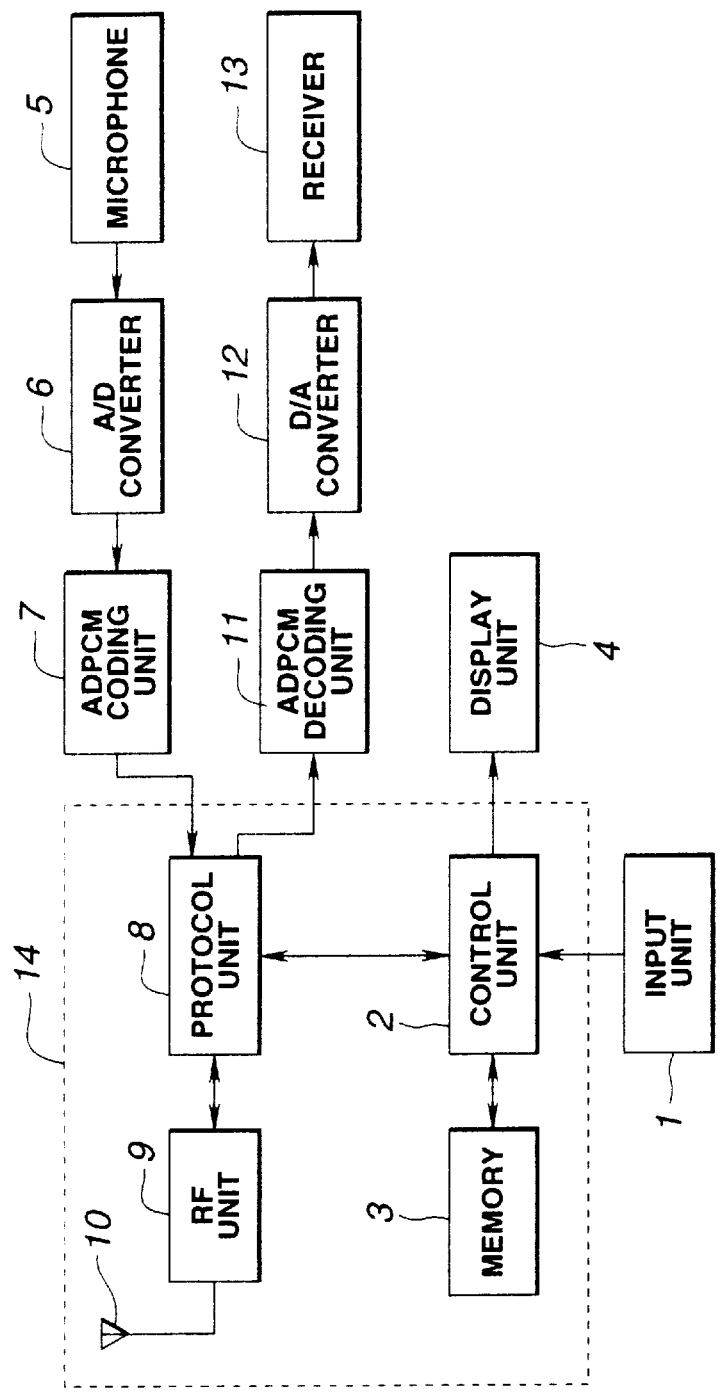
FIG. 1 is a block diagram showing an arrangement of a mobile communication subscriber apparatus to which the present invention is applied.

The digital cordless phone according to the embodiment of the invention, as shown in FIG. 1, includes an input unit 1 for enabling a user into input data to the cordless phone itself, a control unit 2 for performing various operations of this digital cordless phone, a memory 3 for storing various kinds of data, a display unit 4 for displaying various kinds of information, microphone 5 for inputting a speech, an analog-to-digital converter 6 for converting an analog signal into a digital signal, an ADPCM coding unit 7 for performing an ADPCM (Adaptive Differential Pulse Code Modulation) coding operation, an protocol unit 8 for performing a protocol processing, a RF unit 9 for high-frequency modulating, an antenna 10 for sending and receiving a signal, an ADPCM decoding unit 11 for decoding the ADPCM coded signal, a digital-to-analog converter 12 for converting a digital signal into an analog signal, and a receiver 13 for outputting speech.

In the digital cordless phone, the input unit 1 is used for receiving a data input from a user and thus provides numeric keys and operation keys. When a key of the input unit 1 is pressed, a figure registered in the key or data indicating an operation is entered into the control unit 2. That is, when the user places a call or receives a call, a key of the input unit 1 is pressed so that a signal indicated by the key is sent out to the control unit 2.

The control unit 2 provides a central processing unit (CPU) and performs various processings in response to a signal entered from the input unit 1 or a signal sent from the outside. More specifically, the control unit 2 gives an instruction to produce a calling sound when a call is placed, send a phone number of a destination when placing a call, register a position to a base station when used at the external mode, or release the registration of the position to the base station when stopping the use at the external mode. In such an operation, the control unit 2 refers to the data stored in the memory 3 or writes the data in the memory 3 if necessary.

The memory 3 is used for storing various kinds of data. More specifically, the memory 3 contains identification data of the digital cordless phone itself, identification data of a local base station a phone number of the local base station and data about the settings of the answering function of the local base station (called answering control data) pre-written therein. Further, this memory 3 also has a rewritable area where a user can register any phone number.

In turn, the display unit 4 is used for displaying various kinds of information and is provided with an LCD (Liquid Crystal Display) device. Herein, the display device provides functions of displaying information about the digital cordless phone and displaying the setting status of the answering functions of the local base station which will be discussed.

In the digital cordless phone, the microphone 5 is used for receiving speech and serves to convert input speech into an analog signal and then send the analog signal into the analog-to-digital converter 6. The analog-to-digital converter 6 operates to convert the analog signal sent from the microphone 5 into a digital signal and then sends the digital signal to the ADPCM coding unit 7. The ADPCM coding unit 7 performs the ADPCM coding operation with respect to the digital signal sent from the analog-to-digital converter 6 and then sends the ADPCM-coded signal to the protocol unit 8. The protocol unit 8 performs a predetermined protocol processing with respect to the signal sent from the ADPCM coding unit 7 and then sends the processed signal into the RF unit 9. The RF unit 9 performs high-frequency modulation with respect to the signal sent from the protocol unit 8 and then sends the modulated signal into the antenna 1. Then, the antenna 10 serves to send the signal from the RF unit 9 to the outside.

Further, the antenna 10 is used for receiving the harmonic-modulated signal from the outside and sending it to the RF unit 9. The RF unit 9 operates to demodulate the signal sent from the antenna 10 and send the demodulated signal to the protocol unit 8. The protocol unit 8 performs a predetermined protocol processing with respect to the signal sent from the RF unit 9 and then sends the processed signal to the ADPCM decoding unit 11. The signal from the protocol unit 8 is ADPCM-coded. Hence, the ADPCM decoding unit 11 operates to decode the ADPCM-coded signal. That is, the ADPCM decoding unit 11 operates to decode the signal sent from the protocol unit 8 and then sends the decoded signal to the digital-to-analog converter 12. The digital-to-analog converter 12 operates to convert the signal sent from the ADPCM decoding unit 11 into the analog signal and then send it to the receiver 13. Then, the receiver 13 is used for outputting speech and thus serves to convert the analog signal from the digital-to-analog converter 12 into speech and then output it.

The digital cordless phone operates to send and receive a speech signal when it is operated to communicate with another person. Further, the digital cordless phone operates to send a data signal when it registers a position to a base station or release the registration of the position to the base station. Hence, the description will be oriented to transmission of a speech signal, reception of a speech signal and transmission of a data signal executed in the digital cordless phone.

When the digital cordless phone sends the speech signal, at first, the speech input into the microphone 5 is converted into an analog signal through the effect of the microphone 5 itself. Then, this analog signal is converted into the digital signal through the analog-to-digital converter 6. Afterwards, this digital signal is ADPCM-coded by the ADPCM coding unit 7. The coded signal is then processed by the protocol unit 8. More specifically, the protocol unit 8 operates to divide the sending data into the orthogonal components for obtaining each piece of IQ data. Afterwards, the IQ data is orthogonally modulated by the RF unit 9 and amplified into a high frequency signal. This amplified signal is sent through the antenna 10.

When the position of the digital cordless phone is registered to the base station so that the digital cordless phone is usable at the external mode, the radio wave from the digital cordless phone is sent to the base station. On the other hand, when the position of the digital cordless phone is not registered to the base station so that the digital cordless phone is usable at the internal mode, the radio wave from this digital cordless phone is sent to the local base station.

When the digital cordless phone receives the speech signal, at first, the RF signal from the local base station or the base station is received by the antenna 10 and then is modulated by the RF unit 9. Then, the modulated signal, which is made to be base band data, is protocol-processed by the protocol unit 8. Through this protocol processing, the received data can be taken. This received data is taken as the ADPCM-coded signal. Then, the received data that is taken as the ADPCM-coded signal is decoded by the ADPCM decoding unit 11. Next, the decoded signal is converted into an analog signal through the digital-to-analog converter 12. This analog signal is converted into speech through the effect of the receiver 13.

When receiving the speech signal, if the position of the digital cordless phone is registered to the base station so that the digital cordless phone may be used at the external mode, the speech signal to be given to the digital cordless phone is sent from the base station. On the other hand, if the position of the digital cordless phone is not registered to the base station so that the phone may be used at the internal mode, the speech signal to be given to this digital cordless phone is sent from the local base station.

When the digital cordless phone operates to send a data signal, at first, the target data is sent to the control unit 2 and then is processed therein. The target data includes the data entered from the input unit 1 and the data written in the memory 3. The data written in the memory 3, as mentioned above, contains the identification data of this digital cordless phone, the identification data and the phone number of the local base station to the digital cordless phone, the answering control data, and so forth. Then, the data processed by the control unit 2 is sent to the protocol unit 8 and then is processed thereby. The processed data is made to be the target data. Next, the target data is high-frequency modulated by the RF unit 9 and then is sent to the antenna 10.

When the data signal is sent for registering the position of the digital cordless phone to the base station or for releasing the registration of the position to the base station, the digital cordless phone according to this embodiment operates to read the answering control data from the memory 3 and automatically send this control data.

As mentioned above, when sending the answering control data, at first, the control data is read from the memory 3 and then is processed by the control unit 2. The control unit 2 operates to convert the control data into the ADPCM-coded signal, that is, the DTMF signal. This is because the answering phone function of the local base station is set to be remotely controlled by the DTMF signal. Next, the control data processed by the control unit 2 is sent to the protocol unit 8 and then is processed thereby. This results in changing the control data into the data to be sent. Afterwards, this signal is high-frequency modulated by the RF unit 9 and then is sent to the antenna 10.

As set forth above, in the digital cordless phone, the memory 3, the control unit 2, the protocol unit 8, the RF unit 9 and the antenna 10 act as a control signal sending unit 14 for giving an indication for changing the settings of the answering function of the local base station when the position is registered or the registered position is released.

Further, if the answering control data is sent as mentioned above and thereby the settings of the answering function of the local base station are changed, the digital cordless phone displays the setting status of the answering function of the local base station on the display unit 4.

Figure 2:
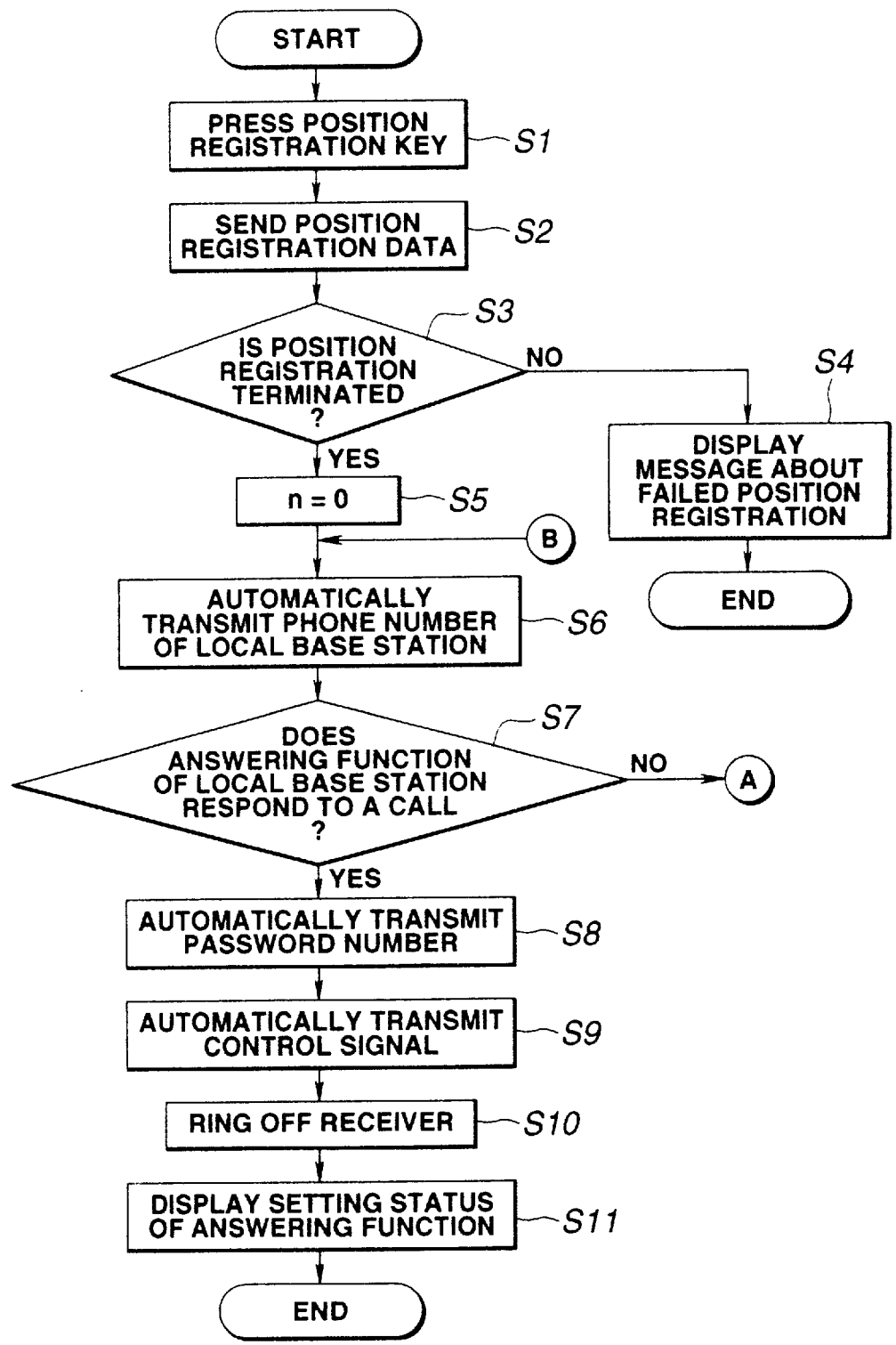
FIG. 2 is a flowchart showing a procedure for sending control data for an answering machine when a mobile communication subscriber apparatus registers a position to a base station.
Figure 3:
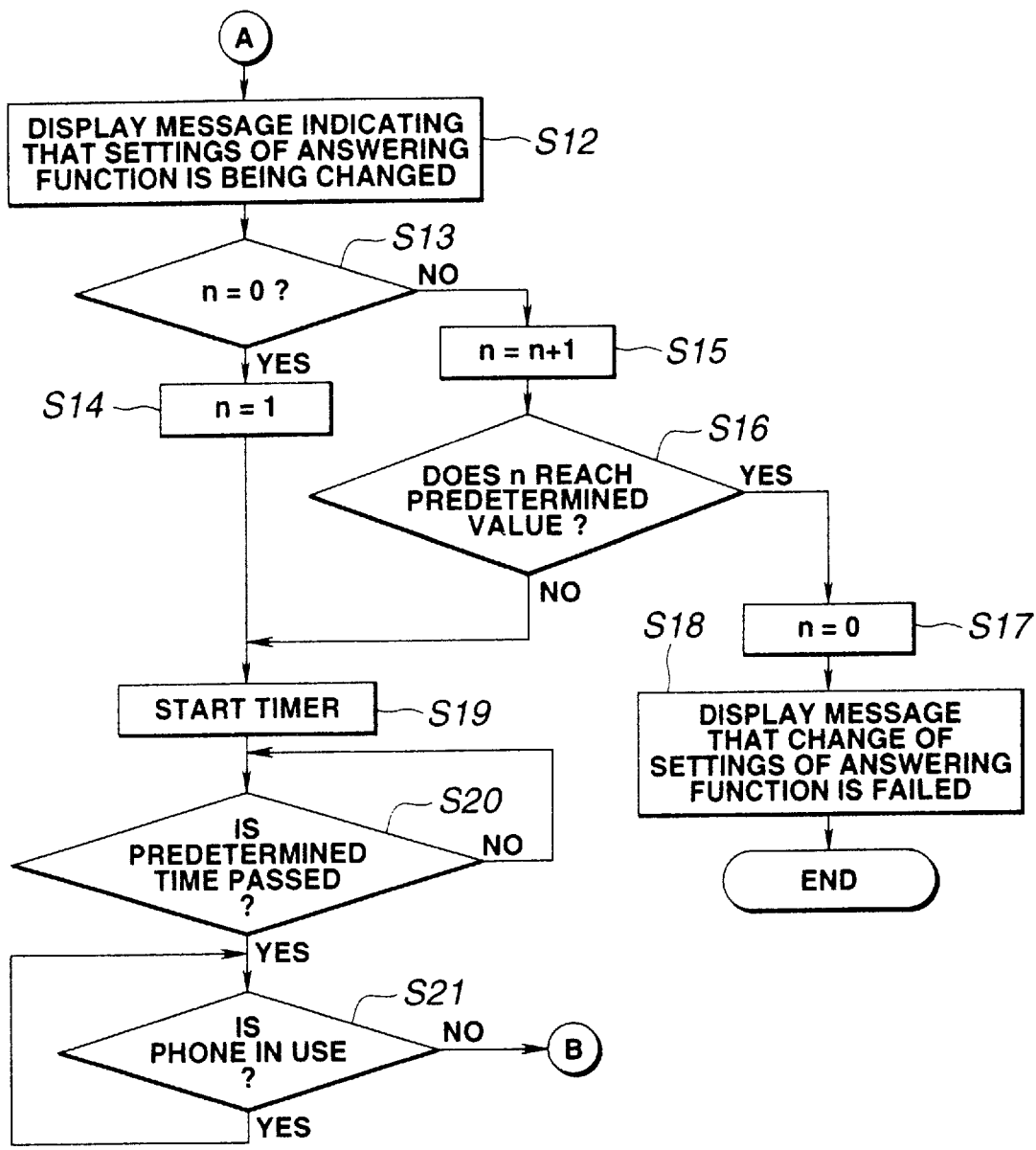
FIG. 3 is a flowchart showing another procedure for sending control data for an answering machine when a mobile communication subscriber apparatus registers a position to a base station.

In turn, the description will explain to how the answering control data is sent when the position of the digital cordless phone is registered to the base station so that the digital cordless phone may be used at the external mode with reference to the flowcharts shown in FIGS. 2 and 3.

When the position is not registered, as shown in FIG. 2, at a step S1, a position registration key located on the input unit 1 is depressed. Then, at a step S2, the operation is executed to send out the data for registering the position of the digital cordless phone to the base station.

In a case when the position registration key located on the input unit 1 is depressed and the position is not registered in the base station, the position of the digital cordless phone is registered to the base station. This position registration may be executed by the automatic operation. That will then be for example, when the local base station is far from the digital cordless phone so that the propagation of the radio wave between the local base station and the digital cordless phone is made worse, the automatic operation is executed to allow the digital cordless phone to send the data for registering the position of the cordless phone to the base station, thereby switching the operation mode of the cordless phone to the external mode.

Next, at a step S3, the control unit 2 determines if the position registration is terminated properly on the basis of the response from the base station. If the position registration is not terminated properly, the operation goes to a step S4. If the position registration is terminated properly, the operation goes to a step S5.

At the step S4, the digital cordless phone displays a message indicating that the position registration is failed on the display unit 4. At this time, the answering control data is not sent out. The process is terminated here.

On the other hand, at the step S5, the control unit 2 sets a parameter n as 0. The parameter n is a parameter indicating how often the digital cordless phone places a call to the local base station. Afterwards, at a step S6, this digital cordless phone operates to automatically place a call to the local base station. That is, at the step S6, the phone number of the local base station is read out of the memory 3 and then is automatically sent out.

Next, at a step S7, the control unit 2 determines if the local base station enables the answering function to respond to the signal from the digital cordless phone. If the local base station responds, the operation goes to a step S8. If the local base station does not do it, the operation goes to a step S12 shown in FIG. 3.

At the step S8, this digital cordless phone operates to send out a password number required for changing the settings of the answering function of the local base station. That is, at a step S8, the operation is executed to read from the memory 3 the password number required for changing the settings of the answering function of the local base station and then automatically send the password number converted into the DTMF signal. If the local base station does not have such a password number set thereto, the sending of the password number at the step S8 is not necessary.

Next, at the step S9, the digital cordless phone operates to send a control signal for giving an indication for changing the setting of the answering function of the local base station. That is, at the step S9, the answering control data is read out of the memory 3 and then is automatically sent out as the DTMF signal.

At the step S9, the digital cordless phone is served to send out a control signal for giving an indication for changing an automatic answering message of the local base station so that the automatic answering message issued by the answering function of the local base station correlates with the current state of the digital cordless phone. More specifically, for example, since the digital cordless phone may be used at the external mode, the operation is executed to send out the control signal for giving an indication for changing the pre-recorded automatic answering message from "I am now away from home. Please leave your message, name and phone number," to "I am now away from home. If you have an urgent matter, please place a call to a cordless phone number XXX—XXX—XXX."

Further, at this step S9, the digital cordless phone operates to send the control signal for giving an indication for changing the setting of the answering function of the local base station so that the message recorded in the local base station is transferred to the digital cordless phone. In response to the control signal, the settings of the answering function of the local base station are changed. Accordingly, if a message is recorded in the local base station, the local base station is operated to automatically place a call to the digital cordless phone, so that the user of the digital cordless phone may get the information that the message has been recorded. And, since the answering function of the local base station is allowed to be remotely controlled, when that information is obtained by the user, the user operates his or her digital cordless phone to send out the DTMF signal to the local base station so that the recorded message is reproduced. Hence, the user can promptly listen to that message.

Moreover, if the answering function of the local base station provides a function of transferring a call placed from the outside to the digital cordless phone, at the step S9, the digital cordless phone may be arranged to send out the control signal for giving an indication for changing the setting of the answering functions of the local base station so that the call itself may be directly transferred to the digital cordless phone. In this case, since the call from the outside is directly transferred to the digital cordless phone, someone who places a call to the local base station does not need to leave the message but can make a direct contact with the user of the digital cordless phone.

Next, after the settings of the answering function of the local base station are changed, the operation goes to a step S10. At this step, the digital cordless phone operates to automatically cut off the call to the local base station. Next, at a step S11, the setting state of the answering function of the local base station is displayed on the display unit 4. Then, the process is terminated.

At the step S9, when the answering function of the local base station is changed from the automatic answering message into the notice of the phone number of the digital cordless phone, the display unit is operated to display a message indicating that the phone number of the digital cordless phone is being guided to the caller. Further, at the step S9, when the answering function of the local base station is changed to transfer the message of the caller recorded in the local base station to the digital cordless phone, the display unit is operated to display the message indicating the transfer of the recorded message.

On the other hand, as mentioned above, at the step S7, when the answering function of the local base station does not respond to the phone number sent from the cordless phone, the operation goes to a step S12 shown in FIG. 3.

At this step S12, the display unit 4 is operated to display a message indicating that the settings of the answering function of the local base station are changing.

Next, at a step S13, the control unit 2 determines if the parameter n is zero (0). If it is zero, the operation goes to a step S14, where a value of n is set to the parameter 1. Then, the operation goes to a step S19.

On the other hand, at the step S13, if the parameter n is not zero, the operation goes to a step S15. At this step, the control unit 2 is operated to add one to the parameter n. Then, at a step S16, the control unit 2 determines if the parameter n reaches a predetermined value. If n reaches a predetermined value, the operation goes to a step S17. If n does not reach a predetermined value, the operation goes to a step S19. The predetermined value indicates how many times the digital cordless phone tries to place a call to the local base station. For example, it may be set to 5.

At the step S17, the control unit 2 is operated to set a value of zero to the parameter n. Then, at the step S18, the digital cordless phone is operated so that the display device provided in the display unit 4 displays a message indicating that the change of the settings of the answering function of the local base station is failed. At this stage, the process has terminated without changing the settings of the answering function of the local base station.

On the other hand, at the step S19, the control unit 2 starts a timer for measuring a predetermined time. Then, at a step S20, the control unit 2 repeatedly determines if the predetermined time is passed. Herein, the predetermined time indicates a time between one call of the cordless phone to the local base station and the subsequent call. For example, it is set approximately three minutes. If the predetermined time is passed and the timeout takes place, the operation goes to a step S21.

At the step S21, the control unit 2 determines if the digital cordless phone is being used for the communication. If it is in use, the determination is repeated until it is out of use. If, on the other hand, it is not in use, the operation returns to the step S6 shown in FIG. 2, at which the foregoing process is retried.

Following the foregoing steps, the process is executed for sending of the answering control data in association with the registration of the position to the base station.

Figure 4:
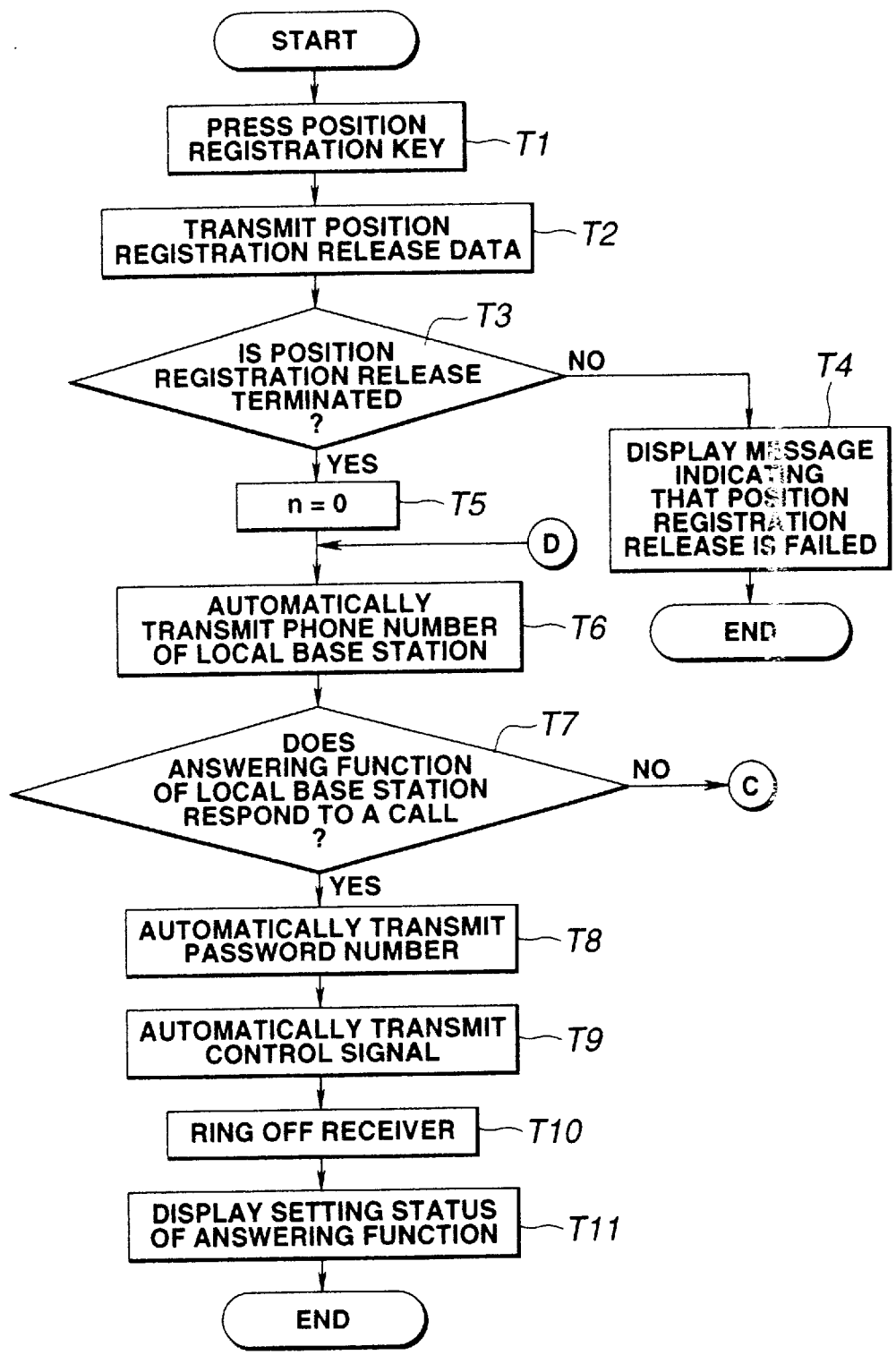
FIG. 4 is a flowchart showing another procedure for sending control data for an answering machine when a mobile communication subscriber apparatus releases the registration of a position to a base station.
Figure 5:
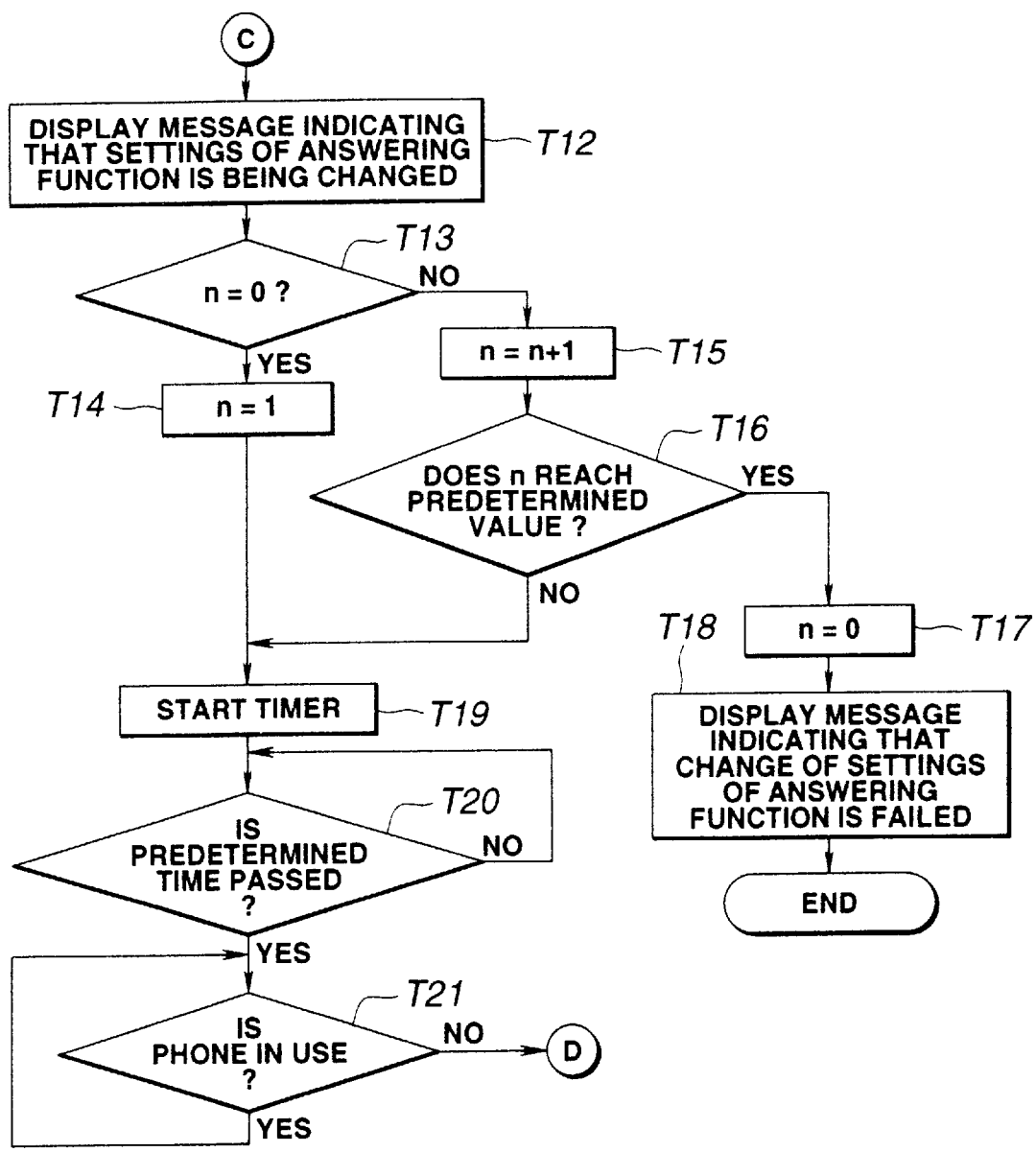
FIG. 5 is a flowchart showing another procedure for sending control data for an answering machine when a mobile communication subscriber apparatus releases the registration of a position to a base station.

Next, the description will explain how the answering control data is sent when the registration of the position to the base station is released for stopping the operation of the digital cordless phone at the external mode with reference to the flowcharts of FIGS. 4 and 5.

While the position is registered to the base station, as shown in FIG. 4, at a step T1, the position registration key located in the input unit 1 is depressed. At the next step T2, the operation is executed through a D channel to send out the data for releasing the position registration of the digital cordless phone to the base station.

Herein, if the position registration key located in the input unit 1 is depressed when the position of the digital cordless phone is registered to the base station, the position registration is released. Instead, this release of the position registration may also be performed by an automatic operation. That is, for example, when the local base station comes closer to the digital cordless phone and the propagation of the radio wave between the local base station and the cordless phone is improved, the operation is executed to allow the digital cordless phone to automatically send out the data for releasing the position registration of the cordless phone to the base station, so that the operation mode is automatically switched to the internal mode.

Next, at a step T3, the control unit 2 determines if the release of the position is terminated properly. If it is not terminated properly, the operation goes to a step T4. If it is terminated properly, the operation goes to a step T5.

At the step T4, this digital cordless phone operates to display a message that the release of the position registration has failed in the display unit 4. At this time, herein, the process is terminated without sending out the answering control data.

On the other hand, at the step T5, the control unit 2 operates to set the parameter n to zero. This parameter n records how many times the cordless phone has placed a call to the local base station. Afterward, at a step T6, this digital cordless phone operates to automatically place a call to the local base station. That is, at the step T6, the operation is executed to read out the phone number of the local base station from the memory 6 and then automatically send out the phone number.

Next, at the step T7, the control unit 2 determines if the answering function of the local base station is properly operated to respond to a signal from the cordless phone. If it does respond the operation goes to a step T8. If it does not respond, the operation goes to a step T12 shown in FIG. 5.

At the step T8, the digital cordless phone operates to send out the password number required for changing the settings of the answering function of the local base station. That is, at the step T8, the operation is executed to read the password number required for changing the settings of the answering function of the local base station from the memory 3 and then automatically send out the password number as the DTMF signal. If such a password number is not set to the local base station, the sending of the password number at the step T8 is not necessary.

Next, at the step T9, this digital cordless phone operates to send out the control signal indicating the change of the settings of the answering function of the local base station. That is, at the step T9, the answering control data is read out of the memory 3 and then is automatically sent out as the DTMF signal.

At the step T9, the digital cordless phone operates to send out the control signal indicating the change of the automatic answering message of the local base station so that the automatic answering message of the answering function of the local base station correlates with the operating state of the digital cordless phone. More specifically, for example, since the digital cordless phone is not usable, the operation is executed to send out the control signal indicating that the pre-recorded automatic answering message "I am now away from home. If you have an urgent matter, please place a call to a cordless phone number XXX—XXX—XXX. If you don't, please leave your message in the answering machine," is automatically switched to the answering message "I am now away from home. Please leave your message, name and phone number."

Further, at this step T9, the digital cordless phone operates to send out the control signal for indicating the change of the settings of the answering function of the local base station so that if a message is left in the local base station, the message is not transferred to the digital cordless phone. The control signal changes the settings of the answering function of the local base station. This results in suppressing the automatic call given from the local base station to the digital cordless phone if a message is left in the local base station.

In addition, if the answering function of the local base station is set so that the call itself placed from the outside is transferred to the digital cordless phone, at the step T9, the operation may be arranged to send out a control signal for indicating the change of the settings of the answering function of the local base station so that the direct transfer of the call itself from the outside is stopped.

Then, as mentioned above, if the settings of the answering function of the local base station are changed, the operation goes to a step T10. At this step, the digital cordless phone operates to automatically cut off the call to the local base station. At the next step T11, the setting state of the answering function of the local base station is displayed on the display device of the display unit 4. Then, the process is terminated.

At the step T9, if the automatic answering message of the local base station is changed so that the message does not contain the phone number of the digital cordless phone, the display device is operated to display a message indicating that the phone number of the digital cordless number is not now guiding. Instead, by cancelling the message indicating that the phone number of the digital cordless phone is now guiding, it is also possible to inform someone who places a call to the local base station of the fact that the phone number of the digital cordless number is not now guiding.

Further, at the step T9, the settings of the answering function of the local base station are changed so that if a message is left in the local base station, the message is not transferred to the digital cordless phone. In this case, the display device is operated to display the message indicating that if a message is left in the local base station, the message is not transferred to the digital cordless phone. Instead, by cancelling the message indicating that a message left in the local base station is transferred to the digital cordless phone, it is also possible to inform the caller that if his or her message is left in the local base station, the message is not transferred to the digital cordless phone.

On the other hand, as mentioned above, at the step T7, when the answering function of the local base station is not operative, the operation goes to a step T12 shown in FIG. 5.

At this step T12, the digital cordless phone operates to display in the display unit 4 a message indicating that the change of the settings of the answering function of the local base station is being attempted.

Next, at the step T13, the control unit 2 determines if the parameter n is zero. If n is zero, the operation goes to a step T14. At this step T14, the parameter n is set to 1, and the operation goes to a step T19.

On the other hand, at the step T13, if the parameter n is not zero (0), the operation goes to a step T15. At this step, the control unit 2 adds 1 to the parameter n. Then, at the next step T16, the control unit 2 determines if the parameter n reaches a predetermined value. If it has reached a predetermined value, the operation goes to a step T17. If it has not reached a predetermined value, the operation goes to a step T19. Herein, the predetermined value indicates how many times the digital cordless phone tries to place a call to the local base station. For example, the value may be sent to 5.

At the step T17, the control unit 2 operates to set zero to the parameter n to zero. Next, at the step T18, this digital cordless phone operates to display in the display unit 4 a message indicating that the change of the settings of the answering function of the local base station has failed. In this case, herein, the process is terminated without keeping the settings of the answering function of the local base station intact.

On the other hand, at the step T19, the control unit 2 starts a timer for measuring a predetermined time. Then, at a step T20, the control unit 2 repeatedly determines if the predetermined time has passed. Herein, the predetermined time means a time between one call to the local base station and the next call to the local base station. For example, it is set to approximately 3 minutes. If the predetermined time is passed and the timeout takes place, the operation goes to a step T21.

At the step T21, the control unit 2 determines if the digital cordless phone is in contact with another phone. If it is in contact, the determination is repeated until the phone is out of contact. On the other hand, if it is not in contact, the operation returns to the step T6 shown in FIG. 4, where the foregoing process is tried again.

Following the foregoing steps, the process for transmission of the answering control data is executed in association with the release of the position registration to the base station.

Figure 6:
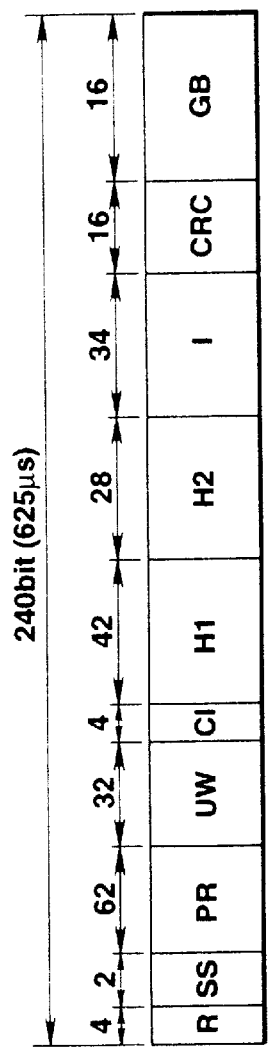
FIG. 6 is a view showing a bit composition of a control slot used in a personal handyphone system.

The aforementioned digital cordless phone may be applied to a personal handyphone system (PHS) that is made commercially available in Japan. The bit composition of a control slot of a control channel provided in the PHS is shown in FIG. 6. As shown, the bit composition of the control slot provided in the PHS includes a 4-bit transient answering ramp time R, a 2-bit start symbol SS, a 62-bit bit-synchronizing preamble PR, a 32-bit synchronous word UW, a 4-bit channel identifying signal CI, a 42-bit transmit identifying code H1, a 28-bit receive identifying code H2, a 34-bit control data I, a 16-bit redundancy code check data CRC, and a 16-bit guard bit GB. The total number of the bits of the control slots is 240 and the length thereof is 625 $\mu$s. When the digital cordless phone designed for the PHS operates to register the position to the base station, the data used for the position registration is put in the control data I included in the control slot when it is sent out.

Figure 7:
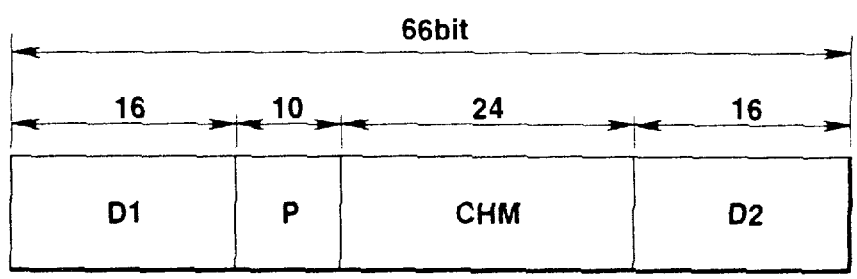
FIG. 7 is a view showing a bit composition of a control slot used in a CT-2.

Further, the aforementioned digital cordless phone may be applied to a cordless telephone 2 (CT-2) that is made commercially available in Europe. The bit composition of the control slot used in the control channel of the CT-2 is shown in FIG. 7. As an example, the bit composition includes a 16-bit control data D1, a 10-bit bit-synchronizing preamble P, a 24-bit frame-synchronizing signal CHM, and a 16-bit control data D2. The total number of the bits composing the control slot is 66. When the digital cordless phone designed for the CT-2 operates to register the position to the base station, the data used for the position registration is divided into two parts of 16 bits each and these parts are the control data D1 and D2 of the control slot respectively to be sent out.

The digital cordless phone may be applied to variable systems including the PHS and the CT-2 if it is operated to register the position to the base station at the external mode.

Many different embodiments of the present invention may be constructed without departing from the spirit and scope of the present invention. It should be understood that the present invention is not limited to the specific embodiments described in the specification, except as defined in the appended claims.

What is claimed is:

1. A mobile communication subscriber apparatus having a function of position registration to a base station, comprising:

control means for generating a control signal for changing an answer machine message of a predetermined answering machine when said mobile communication subscriber apparatus registers a position; and RF signal processing means for transmitting said control signal via an RF signal.

2. The mobile communication subscriber apparatus as claimed in claim 1, wherein said control signal causes a change to an answering message of said answering machine.

3. The mobile communication subscriber apparatus as claimed in claim 1, wherein said control signal causes a transfer of recorded messages in said answering machine to said mobile communication subscriber apparatus.

4. The mobile communication subscriber apparatus as claimed in claim 1, wherein said control signal is a DTMF signal.

5. The mobile communication subscriber apparatus as claimed in claim 1, wherein said position registration is performed by a manual operation.

6. The mobile communication subscriber apparatus as claimed in claim 1, wherein said position registration is performed by an automatic operation.

7. The mobile communication subscriber apparatus as claimed in claim 1, further comprising:

display means for displaying a changed status of said answer machine message of said answering machine.

8. A mobile communication subscriber apparatus having a function of position registration to a base station, comprising:

control means for generating a control signal for changing an answer machine message of a predetermined answering machine when said mobile communication subscriber apparatus discards said position registration; and RF signal processing means for transmitting said control signal via an RF signal.

9. The mobile communication subscriber apparatus as claimed in claim 8, wherein said control signal causes a change to an answering message of said answering machine.

10. The mobile communication subscriber apparatus as claimed in claim 8, wherein said control signal prevents transfer of recorded messages in said answering machine to said mobile communication subscriber apparatus.

11. The mobile communication subscriber apparatus as claimed in claim 8, wherein said control signal is a DTMF signal.

12. The mobile communication subscriber apparatus as claimed in claim 8, wherein a discarding of said position registration is performed by a manual operation.

13. The mobile communication subscriber apparatus as claimed in claim 8, wherein said discarding of said position registration is performed by an automatic operation.

14. The mobile communication subscriber apparatus as claimed in claim 8, further comprising:

display means for displaying a changed status of said function of said answering machine.

15. A signal transmitting method for changing a function of a predetermined answering machine, comprising the steps of:

generating a control signal for changing said function of said answering machine when a mobile communication subscriber apparatus registers a position to a base station; and transmitting said control signal via an RF signal.

16. The signal transmitting method as claimed in claim 15, wherein a change of said function of said answering machine is a change of an answering message of said answering machine.

17. The signal transmitting method as claimed in claim 15, wherein a second change of said answer machine message of said answering machine is a transfer of recorded messages in said answering machine to said mobile communication subscriber apparatus.

18. The signal transmitting method as claimed in claim 15, wherein said control signal is a DTMF signal.

19. The signal transmitting method as claimed in claim 15, wherein a position registration is performed by a manual operation.

20. The signal transmitting method as claimed in claim 15, wherein said position registration is performed by an automatic operation.

21. A signal transmitting method for changing an answer machine message of a predetermined answering machine, comprising the steps of:

generating a control signal for changing said answer machine message of said answering machine when a mobile communication subscriber apparatus discards a registration of a position to a base station; and transmitting said control signal via an RF signal.

22. The signal transmitting method as claimed in claim 21, wherein a second change of said answer machine message of said answering machine is a prevention of transfer of recorded messages in said answering machine to said mobile communication subscriber apparatus.

23. The signal transmitting method as claimed in claim 21, wherein said control signal is a DTMF signal.

24. The signal transmitting method as claimed in claim 21, wherein a position registration is performed by a manual operation.

25. The signal transmitting method as claimed in claim 21, wherein said position registration is performed by an automatic operation.

* * * * *